United States Patent [19]

Gemignani et al.

[11] Patent Number: 4,802,505

[45] Date of Patent: Feb. 7, 1989

[54] FLUID CONTROL VALVE

[75] Inventors: Andre Gemignani, Saint Mitre les Remparts; Serge J. Boulogne, Rognac; Gerald Schaumburg, Martigues, all of France

[73] Assignee: Societe D'Exploitation de Brevets pour L'Industrie et la Marine, Chateauneuf les Martigues, France

[21] Appl. No.: 25,382

[22] Filed: Mar. 13, 1987

[30] Foreign Application Priority Data

Mar. 13, 1986 [FR] France ................................ 86 04120

[51] Int. Cl.[4] ................................................ G05D 16/06

[52] U.S. Cl. .................................. 137/492; 137/627.5; 251/29

[58] Field of Search ................ 137/492, 627.5; 251/29

[56] References Cited

U.S. PATENT DOCUMENTS

| | | | |
|---|---|---|---|
| 919,300 | 4/1909 | Anderson | 137/492 |
| 1,890,494 | 12/1932 | Borden | 137/627.5 |
| 2,213,488 | 9/1940 | Dowrick | 137/627.5 X |
| 2,741,262 | 4/1956 | Crookston | 137/492 |
| 3,584,652 | 6/1971 | Huntington | 137/627.5 |
| 4,620,567 | 11/1986 | Kurtz | 137/627.5 |

*Primary Examiner*—Robert G. Nilson

*Attorney, Agent, or Firm*—Herbert Dunbo; Andrew M. Welford

[57] ABSTRACT

A flow-control valve has a valve housing defining a chamber formed with axially offset source, sump, and user ports. A valve body in the chamber has first and second coaxial but axially independently movable parts, the first part having a mainly axial throughgoing passage having one end exposed continuously to one of the source and sump ports and an opposite axially open end axially sealingly engageable with the second valve part. A central seat between the source and sump ports is axially sealingly engageable with one of the valve parts to isolate one of the source and sump ports from the other of the source and sump ports. The parts are displaceable between one end position permitting flow in the chamber between the user and the other port while blocking flow between same and the one port with the valve parts in sealing engagement with each other and the one valve part out of engagement with the central seat, an intermediate position blocking flow in the chamber between the ports with the valve parts in sealing engagement with each other with the one valve part in sealing engagement with the central seat, and a drain end position permitting flow in the chamber between the user and one port while blocking flow between same and the other port.

3 Claims, 4 Drawing Sheets

FLUID CONTROL VALVE

FIELD OF THE INVENTION

The present invention relates to a fluid control valve. More particularly this invention concerns a valve used in a hydraulic, pneumatic, or hydropneumatic system to feed pressure to or vent a user or load.

BACKGROUND OF THE INVENTION

In many fluid systems it is essential to be able to switch a user back and forth between a pressure source and a sump. Such switching can be used, for example, to control an actuator or to vent excess pressure from a supply or reservoir. The device may be manually operated or may respond to a pressure threshold to switch from a state connecting the user to the pressure source to a state connecting it to the sump, or vice versa.

In the known systems the valve element moves between these two positions—sump-to-user and source-to-user—relatively sluggishly and, in an intermediate position, can actually connect user, source, and sump all together. Furthermore it is possible for the valve element to hang up in this intermediate position with possibly disastrous consequences for the units being controlled. In addition the valve element in these known devices is often a membrane that is flexed with each actuation so that after some time it wears out and must be replaced. Furthermore such valves are usually operated by a separate actuator to which they are connected via some sort of fluid line which can create problems with regard to response time and long-term durability.

OBJECTS OF THE INVENTION

It is therefore an object of the present invention to provide an improved fluid control valve.

Another object is the provision of such a fluid control valve which overcomes the above-given disadvantages, that is which operates very rapidly with no stability in an intermediate position, that responds reliably, and that has a long service life.

SUMMARY OF THE INVENTION

A control valve according to the invention for controlling fluid flow between a user, a high-pressure source, and a low-pressure sump is so constructed and arranged that on displacement of the slide between its end positions at no time is flow permitted between all three ports. In addition the valve body moves on passage between its end positions through an intermediate position blocking flow through the valve chamber between any one of the ports and any other of the ports.

Thus with this arrangement it is impossible for the valve to hang up in the intermediate position and there can also be no cross feed between the three ports. Action will be reliable and swift, with the valve snapping from one end position to the other.

According to another feature of this invention the valve has a valve housing defining a chamber extending along an axis and formed with axially offset source, sump, and user ports respectively connected to the source, sump, and user. The user port opens into the chamber between the source and sump ports. A valve body in the chamber has first and second coaxial but axially independently movable parts, the first part having a mainly axial throughgoing passage having one end exposed continuously to one of the source and sump ports and an opposite axially open end axially sealingly engageable with the second valve part. A central seat between the source and sump ports is axially sealingly engageable with one of the valve parts to isolate one of the source and sump ports from the other of the source and sump ports. The parts are displaceable between one end position permitting flow in the chamber between the user and the other port while blocking flow between same and the one port with the valve parts in sealing engagement with each other and the one valve part out of engagement with the central seat, an intermediate position blocking flow in the chamber between the ports with the valve parts in sealing engagement with each other and with the one valve part in sealing engagement with the central seat, and a drain end position permitting flow in the chamber between the user and one port while blocking flow between same and the other port with the valve parts out of axial contact with each other and with the one valve part in sealing engagement with the central seat.

According to another feature of this invention the seat defines an orifice and the other valve part is engageable through the orifice with the one valve part. A spring urges the one valve part into sealing engagement with the seat and the housing forms with the other valve part a source compartment connectable to the source for urging the other part into axial engagement through the orifice with the one part. The first part is the one part and its opposite end opens radially and the housing forms at this opposite end an axially closed annular chamber into which the one port opens. The second part can also be the one part in which case its opposite end opens axially and the housing forms at this opposite end a chamber into which the one port opens.

The valve housing of this invention also forms a pilot chamber permanently pressurized from the source and formed with a small-diameter extension. A conduit connects the source compartment with the small-diameter extension and a ball in the pilot chamber can sealingly engage over the extension to separate same from the pilot chamber. A pilot spring urges the ball into the extension and an actuating pin is engageable opposite to the pilot spring with the ball for lifting same off the extension. This pin is tubular and has one end sealingly engageable with the ball and an opposite end connected to the sump.

In addition the valve has an actuator formed by a piston engageable with the pin to displace same against the ball. The housing forms an actuator chamber on one side of the piston and connected to a pressure source to be monitored. An actuator spring bears opposite to the actuator chamber on the piston to urge same against the pin so that when the pressure in the actuator chamber exceeds the force of the actuator spring the pin pulls away from the ball to vent the extension and source compartment. This actuator spring is an annular spring washer having an outer periphery fixed in the housing and an inner periphery bearing axially on the piston.

The piston is carried on a membrane according to this invention so that the arrangement can work at very high pressures with virtually no lag or hysteresis.

BRIEF DESCRIPTION OF THE DRAWING

The above and other features and advantages will become more readily apparent from the following, it being understood that any feature described with reference to one embodiment of the invention can be used where possible with any other embodiment. In the accompanying drawing.

SPECIFIC DESCRIPTION

Figure 1:
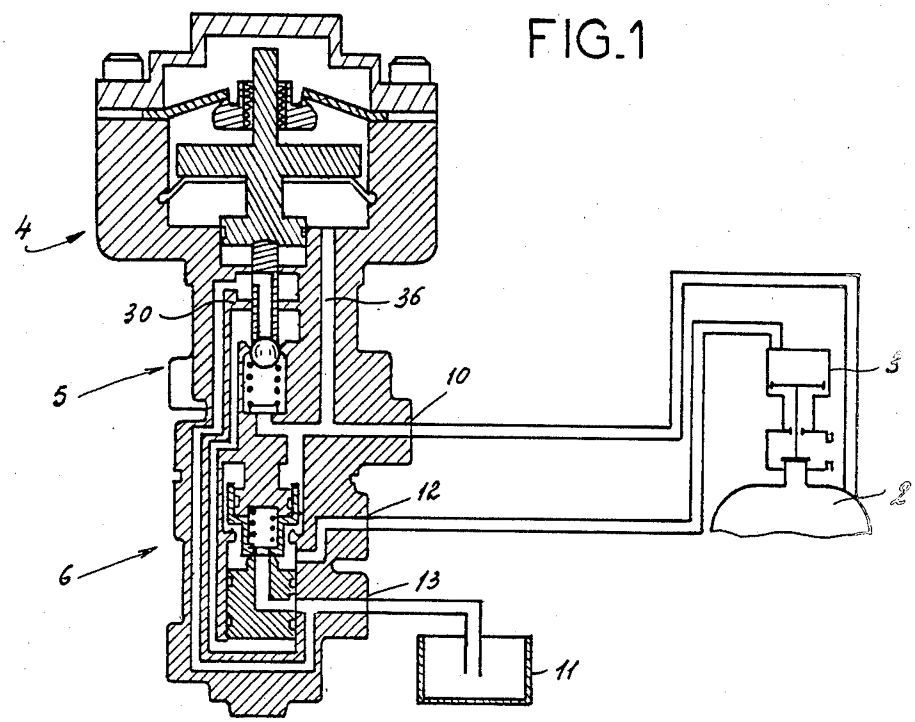
FIG. 1 is a small-scale sectional view of a system for controlling pressure using the valve according to this invention.

As seen in FIG. 1 a bottle 2, for instance full of liquid nitrogen, is provided with a fluid-operated vent valve 3 and is connected to an actuator 4 that operates a pilot valve 5 in turn operating a control valve 6. The actuator 4 has a port 10 connected via a line to the bottle 2 to detect pressure therein and to use the pressure therefrom like a source, and the valve 6 has a port 12 connected to the user constituted by the valve 3 and a port 13 connected to a low-pressure sump 11. This arrangement operates such that, when the pressure in the bottle 2 exceeds a predetermined limit, the valve 3 is depressurized and opens to bleed pressure from this bottle 2 until it is less than the predetermined pressure, whereupon the valve 3 is again closed.

The valve 6 as seen in FIGS. 2 through 6 has a housing 7 centered on an axis A and forming a chamber subdivided into two main compartments 8*a* and 8*b* into which the ports 10 and 12 open, respectively, and the compartment 8*b* has a downward extension 8*c* into which the port 13 opens. A valve body has an upper part 14*a* mainly in the source compartment 8*a* and a lower part 8*b* mainly in the lower user and sump compartments 8*b* and 8*c*, it being understood that the reference to the vertical is merely for convenience of description and that the system would function identically in virtually any orientation with respect to the vertical. The two compartments 8*a* and 8*b* are separated by a washer forming a partition and seat 9 and having a circular passage 15 centered on the axis A.

The lower valve body 14*b* slides in the extension 8*c* and has an end 19 that defines with the end of the body 7 a compartment 20. In addition this part 14*b* is of an outside diameter substantially smaller than that of the passage 15 and is formed with an upwardly open axial passage 17 and with a plurality of radial passages 18, the latter always being in fluid communication with the sump port 13.

The upper valve body 14*a* slides on a guide 23 and is urged downward by a coil spring 16 into flat sealing engagement with the seat 9. The upper end of the mainly tubular body 14*b* can also press sealingly against the lower face of this body 14*a*, but can also move away from it as will be described below.

The guide 23 is formed with radial passages 22 communicating with an axial passage 24 opening into the lower end of a chamber 25 formed in the upper end of the body 7 and formed with an upward small-diameter extension 27 defining a valve seat 31. A pilot-actuating member 30 formed as a tube with a throughgoing passage 32 can slide along the axis A in the body 7 down through the chamber 27 into the chamber 25. The upper end of the passage 32 is connected to the sump 11 as shown in FIG. 1. A ball 26 in the chamber 25 is urged upward toward the member 30 and seat 31 by a spring 28 and can engage sealingly over the passage 32 or with the seat 31. A passage 29 connects the chamber 27 to the chamber 20.

Figure 8:
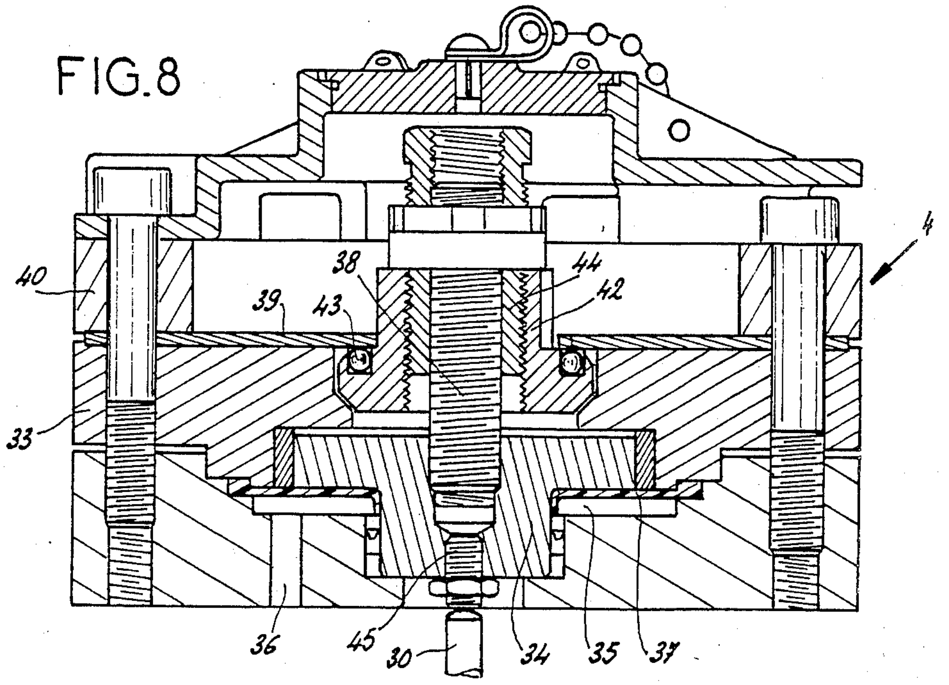
FIG. 8 is an axial section through the actuator for the valve of FIGS. 2 through 6.

The actuating member 30 is operated by the device 4 shown in detail in FIG. 8. This device 4 has a lower housing part 33 bolted to the valve body 7 and containing an axially displaceable piston 34 secured to the inner periphery of an annular membrane 37 whose outer edge is clamped between the part 33 and body 7 so as to form a chamber 35 that is connected via a line 36 to the source port 10. Thus the pressure in the bottle 2 normally urges this piston 34 upward. A spindle 38 is threaded at its lower end into the piston 34 and at its upper end into an adjustment nut 44 itself threaded in an element 42 bearing via an annular array of balls 43 on the inner periphery of a spring washer 39 clamped between the lower housing part 33 and an upper housing part 40 of the actuator 4. In addition another stud 45 is threaded into the lower face of the piston 34 and bears downward on the actuating pin 30.

Figure 2:
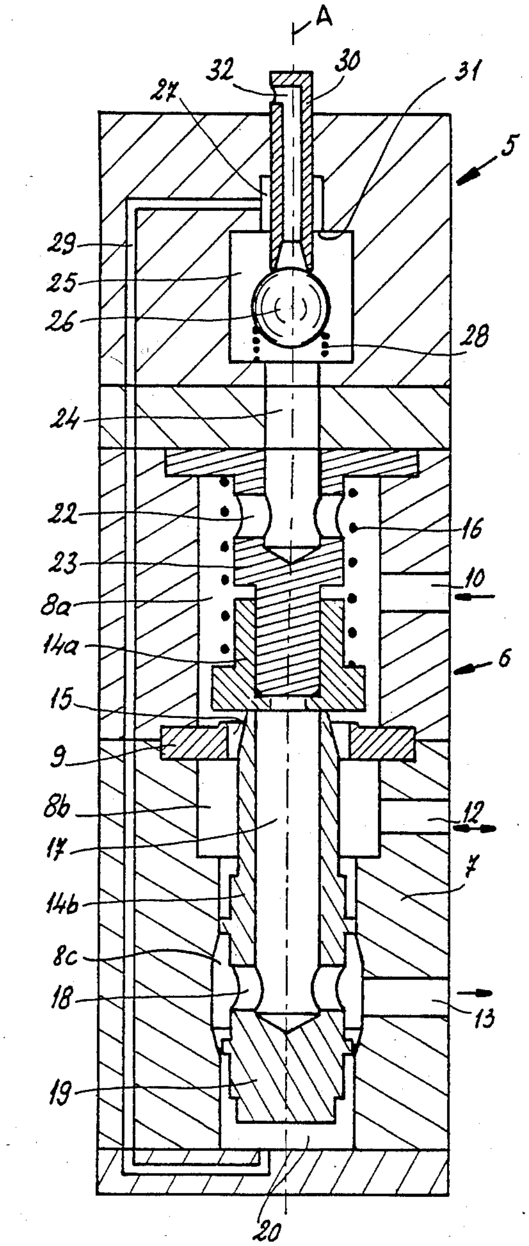
FIGS. 2, 3, 4, 5, and 6 are axial sections through the control valve as it moves between its end positions.

The system operates as follows:

Under normal operating circumstances as shown in FIG. 2 the pressure in the source 2 is insufficient to completely overcome the force of the spring 39 (FIG. 8) so that the piston 34 holds down the pin 30. The ball 26 is held off the seat 31 so that the chambers 25 and 27 are in communication and the ball 26 closes the passage 32. As a result the high pressure from the port 10 can flow via the passage 22, 24 of the guide 23 into the compartment 25 and thence via the compartment 27 and passage 29 into the compartment 20. Such pressurization of the compartment 20 pushes the sump body 14*b* up against the body 14*a*, thereby sealing the upper end of the passage 17 so that the sump port 13 is isolated, and also pushes this body 14*a* up off the seat 9 so that fluid communication is established through the valve orifice 15 between the source port 10 and user port 12. As a result the top of the user or load valve 3 (FIG. 1) is pressurized and the bottle 2 is sealed.

Figure 3:
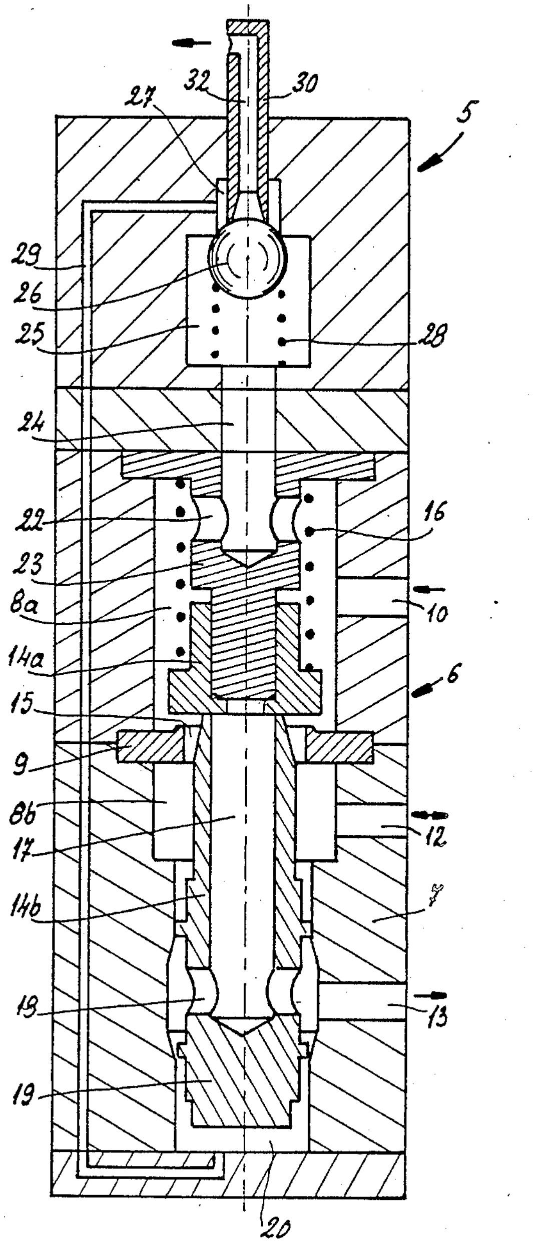
Figure 4:
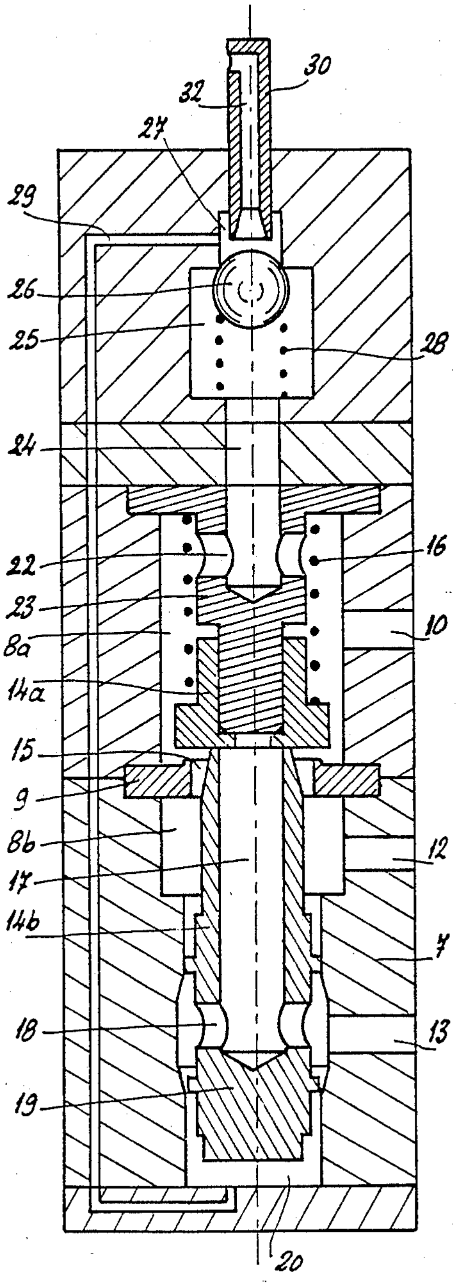
Figure 5:
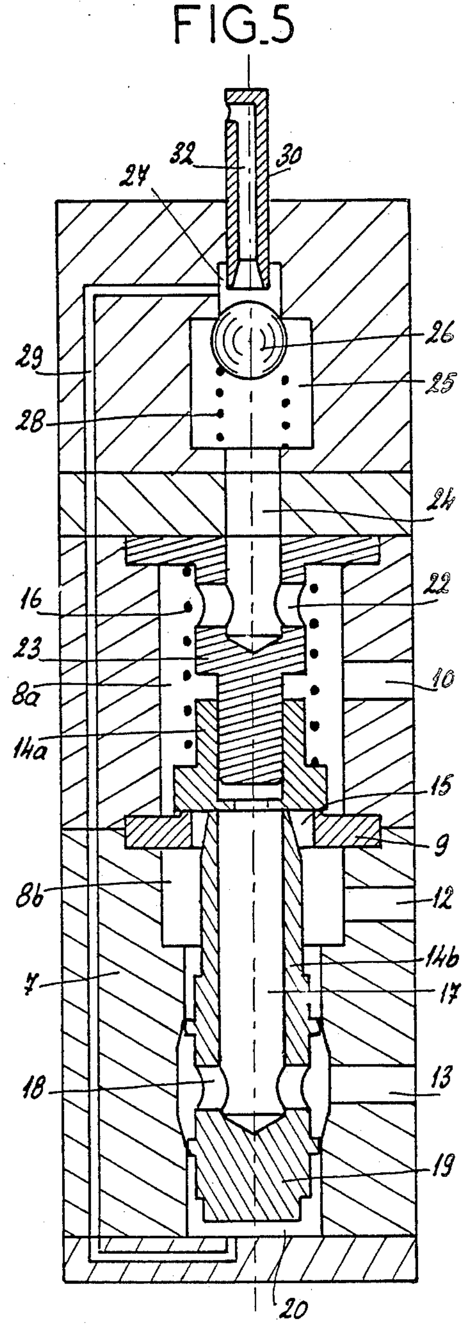

When, however, the pressure in the bottle 2 rises excessively the piston 34 (FIG. 8) is pushed up so that as shown in FIG. 3 the pin 30 and ball 26 are pushed up by the spring 28 and the ball 26 engages the seat 31, thereby isolating the compartments 25 and 27 from each other. Then as shown in FIG. 4 the pin 30 continues to lift so that it pulls free of the ball 26 and opens up the lower end of the passage 32. Since the upper end of the passage 32 is connected (see FIG. 1) to the sump port 13, this vents the compartments 27 and 20 which are interconnected by the conduit 29. As a result, as shown in FIG. 5, the spring 16 pushes the bodies 14*a* and 14*b* both down until the body 14*a* engages the seat 9 and isolates the ports 10 and 12 from each other.

Figure 6:
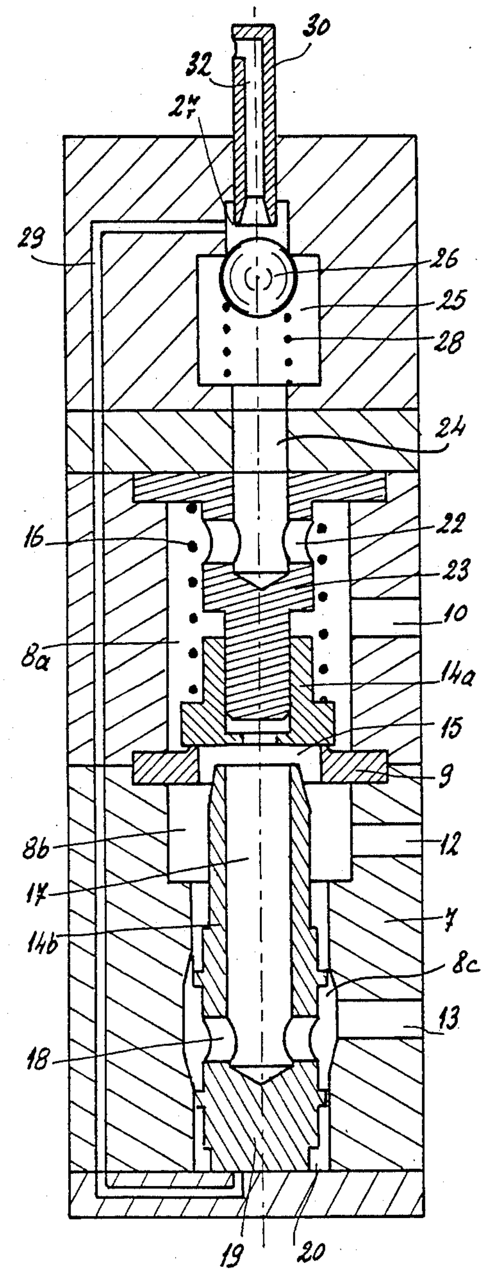

From this position the pressure trapped in the lower compartment 8*b* and gravity will be sufficient to move the lower body 14*b* down and free of the body 14*a* as shown in FIG. 6. This exposes the upper end of the passage 17 and puts the ports 12 and 13 in fluid communication with each other via the compartment 8*b*, the passages 17 and 18, and the compartment 8*c* to depressurize the valve 3 so that it opens and vents the bottle 2.

Of course as pressure drops in the source 3 and at the port 10 the above-given sequence of actions will take place in reverse order, first isolating all three ports 10, 12, and 13 from one another and then opening up fluid communication between the ports 10 and 12.

Figures 7A, 7B:
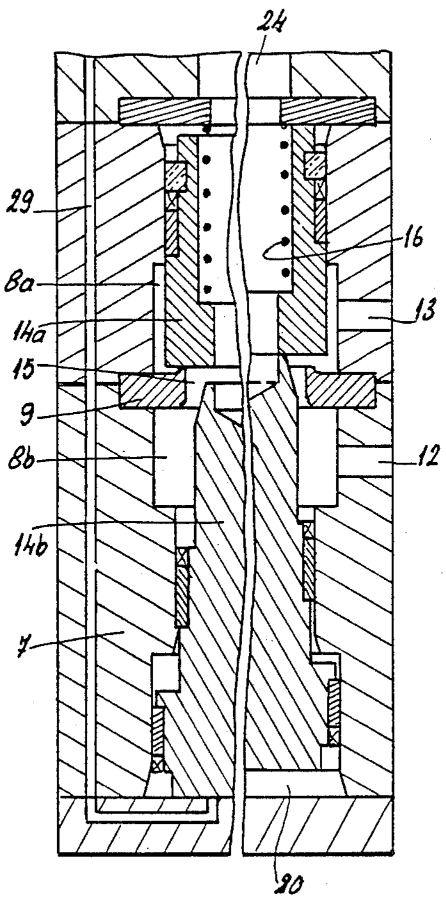
FIGS. 7A and 7B are axial sections through another valve according to this invention in its end positions.

FIGS. 7A and 7B shows a variant on the arrangement of FIGS. 2 through 6 wherein functionally identical elements bear the same reference numerals as in FIGS. 2 through 6. Here the user port 12 opens into the compartment 8*b* but the sump port 13 opens into the chamber 8*a*. In addition the valve part 14*a* is tubular and is internally supplied with fluid under pressure and the element 14*b* is not tubular. The head of the valve 3 is fed as shown in FIG. 7A when the chamber 20 is connected to the sump whereas this valve 3 is depressurized when the chamber 20 is connected to the high-pressure port 12 as shown in FIG. 7B.

With either system there are only three possible modes:

1. All three ports 10, 12, and 13 are cut off from each other.
2. The ports 10 and 12 communicate and the port 13 is isolated.
3. The ports 12 and 13 communicate with each other and the port 10 is isolated.

At no time can all three ports 10, 12, and 13 communicate. In addition it is impossible for the valve to hang up at any intermediate position.

We claim:

1. A valve for controlling fluid flow between a user, a high-pressure source, and a low-pressure sump, the valve comprising:

a valve housing defining a chamber extending along an axis and formed with axially offset source, sump, and user ports respectively connected to the source, sump, and user, the user port opening into the chamber between the source and sump ports;

a valve body in the chamber having first and second coaxial but axially independently movable parts, the first part having a mainly axial throughgoing passage having one end exposed continuously to one of the source and sump ports and an opposite axially open end axially sealingly engageable with the second valve port;

a central seat between the source and sump ports and axially sealingly engageable with one of the valve parts to isolate one of the source and sump ports from the other of the source and sump ports, the parts being displaceable between one end position permitting flow in the chamber between the user and the other port while blocking flow between same and the one port with the valve parts in sealing engagement with each other and one of the valve parts out of engagement with the central seat while the other of the valve parts passes with clearance through the central seat, an intermediate position blocking flow in the chamber between the ports with the valve parts in sealing engagement with each other and with the one valve part in sealing engagement with the central seat and the other valve part passing therethrough, and a drain end position permitting flow in the chamber between the user and one port while blocking flow between same and the other port with the valve parts out of axial contact with each other and with the one valve part in sealing engagement with the central seat, the seat defining an orifice and the other valve part being engageable through the orifice with the one valve part;

a spring urging the one valve part into sealing engagement with the seat, the housing forming with the other valve part a source compartment connectable to the source for urging the other part into axial engagement through the orifice with the one part, the valve housing further forming a pilot chamber permanently pressurized from the source and formed with a small-diameter extension;

a conduit connecting the source compartment with the small-diameter extension;

a ball in the pilot chamber sealingly engageable over the extension to separate same from the pilot chamber;

a pilot spring urging the ball into the extension;

an actuating pin engageable opposite to the pilot spring with the ball for lifting same off the extension;

the pin being tubular and having one end sealingly engageable with the ball and an opposite end connected to the sump;

a piston engageable with the pin to displace same against the ball, the housing forming an actuator chamber on one side of the piston and connected to a pressure source to be monitored; and an actuator spring bearing opposite to the actuator chamber on the piston to urge same against the pin, whereby when the pressure in the actuator chamber exceeds the force of the actuator spring the pin pulls away from the ball to vent the extension and source compartment.

2. The control valve defined in claim 1 wherein the actuator spring is an annular spring washer having an outer periphery fixed in the housing and an inner periphery bearing axially on the piston.

3. The control valve defined in claim 2, further comprising a flexible membrane seated in the housing and carrying the piston.

* * * * *